US006409167B1

(12) United States Patent
Bohn (10) Patent No.: US 6,409,167 B1
(45) Date of Patent: Jun. 25, 2002

(54) PHOTOGRAPHIC PRINT FEEDER FOR SCANNER OR COPIER (75) Inventor: David D. Bohn, Fort Collins, CO (US)

(73) Assignee: Hewlett-Packard Co., Palo Alto, CA (US)

(*) Notice: Subject to any disclaimer, the term of this patent is extended or adjusted under 35 U.S.C. 154(b) by 0 days.

(21) Appl. No.: 09/492,970

(22) Filed: Jan. 27, 2000

(51) Int. Cl.[7] .................................................. B65H 3/06
(52) U.S. Cl. .................... 271/227; 271/12; 271/265.01; 271/275
(58) Field of Search ............................... 271/4.09, 6, 7, 271/12, 198, 275, 227, 258.01, 265.01; 198/626.1, 844.1, 846

(56) References Cited

U.S. PATENT DOCUMENTS

| 3,937,454 A | * | 2/1976 | Colwill | 271/6 |
| 4,329,046 A | * | 5/1982 | Burkett et al. | 271/207 X |
| 5,463,256 A | | 10/1995 | Wang et al. | 271/274 |
| 5,788,227 A | | 8/1998 | Hendrix et al. | 271/3.2 |
| 5,878,319 A | | 3/1999 | Itoh | 399/367 |
| 5,901,950 A | | 5/1999 | Kobayashi et al. | 271/3.24 |
| 5,914,791 A | | 6/1999 | Lin | 358/498 |
| 5,931,456 A | * | 8/1999 | Laidlaw | 271/171 X |
| 5,988,623 A | | 11/1999 | Worley et al. | 271/9.02 |

* cited by examiner

Primary Examiner—Christopher P. Ellis
Assistant Examiner—Mark A. Deuble
(74) Attorney, Agent, or Firm—David M. Mason (57) ABSTRACT In general, the present invention provides an efficient and effective means for positioning multiple documents over a scanning surface of a scanner or copier without a user's intervention. More specifically, the present invention provides an apparatus and process for allowing a plurality of photographic prints to be moved from a tray to a scanning surface and back to the tray without being damaged. Each document is scanned through a transparent belt that protects the document as it moves through the inventive photofeeder and across an associated surface of a scanner or copier.

14 Claims, 7 Drawing Sheets

PHOTOGRAPHIC PRINT FEEDER FOR SCANNER OR COPIER

BACKGROUND OF THE INVENTION

1. Field of the Invention

This invention relates in general to a device for positioning a document over a scanning surface, and more particularly to a process and apparatus for limiting a document's physical interaction with the circulation path of a feeder and the associated scanning surface.

2. Description of the Related Art

Various peripheral devices have been developed over the years to allow a user to make a copy of a document. A document may be a sheet of paper, a transparency or a photographic print. The basic process involves positioning the desired document over a scanning surface so that the image on the document can be captured for reproduction, electronic or paper. However, this straightforward process in not so simple when multiple photographic prints must be copied without the users' intervention. This is particularly true because of the vulnerable nature of the materials used to create and portray an image on a photographic print.

To better understand the above difficulties of using a conventional feeder system for photographic prints, the process used to feed multiple sheets of paper over a scanning surface with a conventional feeder will now follow.

A conventional paper feeder system typically includes multiple rollers for containing a single belt that circulates any desired sheet of paper over the scanning surface when a belt motor is active. More specifically, a feeding roller, positioned adjacent the tray for containing the multiple sheets, rotates to grab a single sheet from the tray. Next, a single system belt drags the grabbed sheet across the feeding roller, the metal borders that secure the scanning surface, and the scanning surface itself to a desired scanning position. After the sheet has been scanned, it is returned to the tray through the enclosed circulation path that the belt creates within the multiple sheet feeder. This process is similar for current feeders used by conventional copy machines.

When a photographic print is used in the above sheet feeder system, the circulation path may force the photo to physically interact with various situations that may damage, or even destroy, the image on the photo. In particular, these situations could include the photo directly interacting with liquids (e.g., cleaning solution) on the scanning surface, a rough surface (e.g., the border containing or an object residing on the scanning surface), small diameter rollers that may bend the photo, and frictional or operational heat created by the circulation path of a conventional document feeder.

SUMMARY OF THE INVENTION

In one aspect of the present invention, an apparatus is provided for positioning a plurality of documents over a scanning surface. The apparatus comprises a peripheral device having a scanning surface and a component housing positioned over the scanning surface. The component housing includes an inner belt, an outer belt that interacts with the inner belt adjacent the scanning surface, a belt motor for circulating the inner belt, a tray for containing the plurality of documents, and a roller motor for moving each document of the plurality of documents contained by the tray to a location where the inner and outer belts can interact with the document.

In another aspect of the instant invention, a method is provided for the use of the above apparatus. In particular, the process includes the steps of: place the plurality of documents in a containing tray; rotate a first circulation belt that interacts with a second circulation belt adjacent the scanning surface; rotate a feed roller to move a document of the plurality of documents to a position where the two circulation belts can interact with the document, position the moved document over the scanning surface using the rotating first circulation belt; scan positioned documents using the peripheral device; and remove the scanned document from the scanning surface.

BRIEF DESCRIPTION OF THE DRAWINGS

Other aspects and advantages of the invention will become apparent upon reading the following detailed description and upon reference to the drawings, in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In general, the present invention provides an efficient and effective means of feeding multiple photographic prints over a desired scanning surface of a scanner or copier. More specifically, the present invention provides an apparatus and process that can sequentially remove, position, and scan a plurality of photographic prints from a holding tray before returning them to the same tray or a return tray. During a portion of this process, each photo is contained between two circulation belts that limit the photo from physically interacting with the scanner and the circulation path, and thereby greatly reduces any chance that the photo can be damaged by the process.

Figure 1:
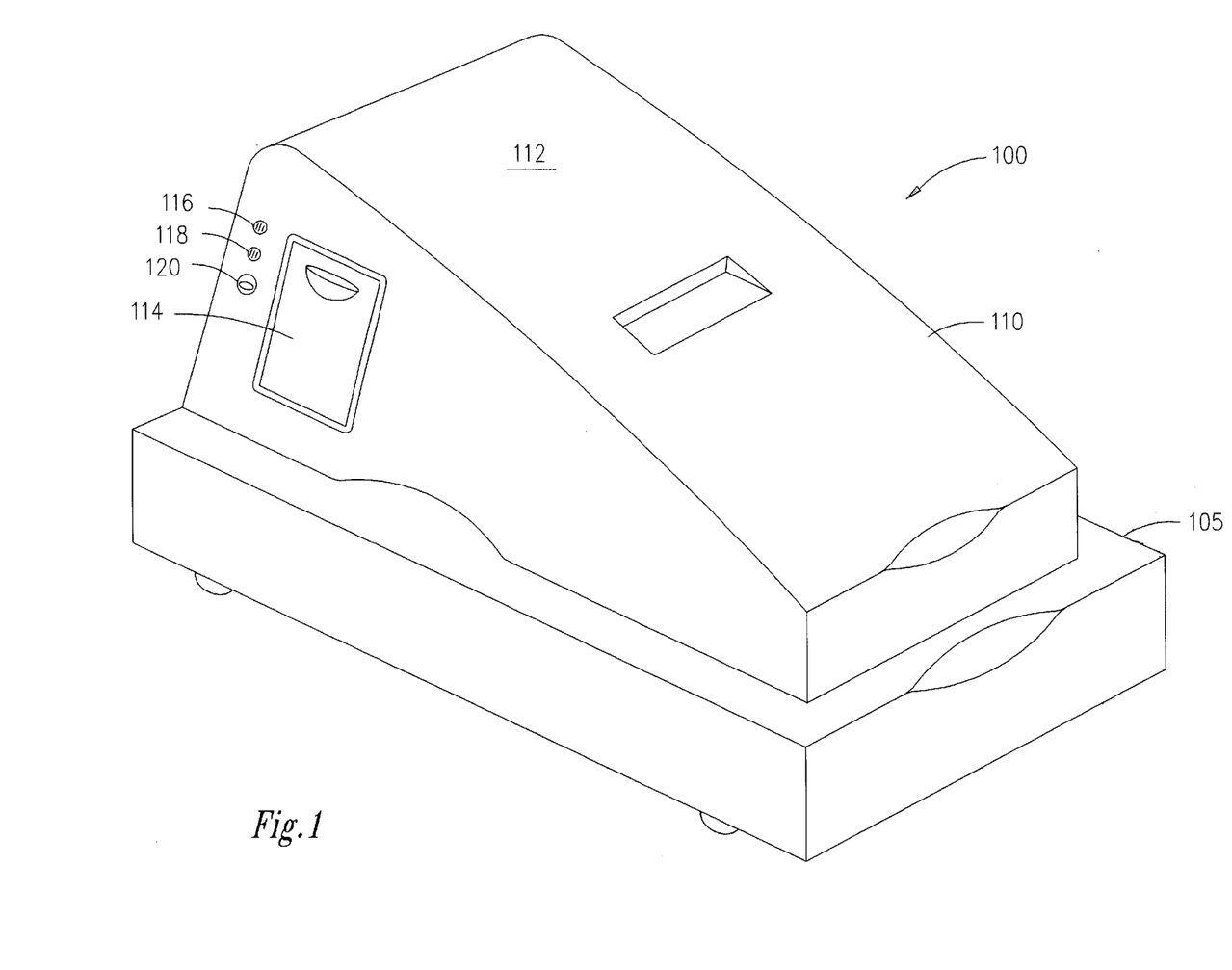
FIG. 1 illustrates an isometric view of a photographic feeder and scanner system in accordance with a preferred embodiment of the present invention.

Referring now to the drawings, FIG. 1 illustrates an isometric view of a photographic print feeder system in accordance with one embodiment of the present invention. Generally, system 100 comprises a conventional peripheral device 105, such as a scanner or copier, and an inventive photographic print feeder ("photofeeder") 110. Since the inventive photofeeder 110 can be used with nearly any conventional scanner or copier, the invention is not so limited to a particular type or brand. However, an example of a conventional scanner or copier that would work well with the inventive photofeeder 110 would include a HP ScanJet 6250C scanner or a Mopier 320 Network copier.

The exterior structure of photofeeder 110 includes a casing 112 having a tray door 114, two system status indicators 116 and 118, and an activation button 120. The casing 112 is removable to allow for easy repairs and manufacturing. The two system indicators 116 and 118 are LED's or similar devices coupled to a system controller unit ("SCU") (not shown). The activation button 120, such as a conventional toggle switch, also couples to the SCU to turn on, initiate and/or stop the inventive photofeeder 110 when desired.

Figure 2:
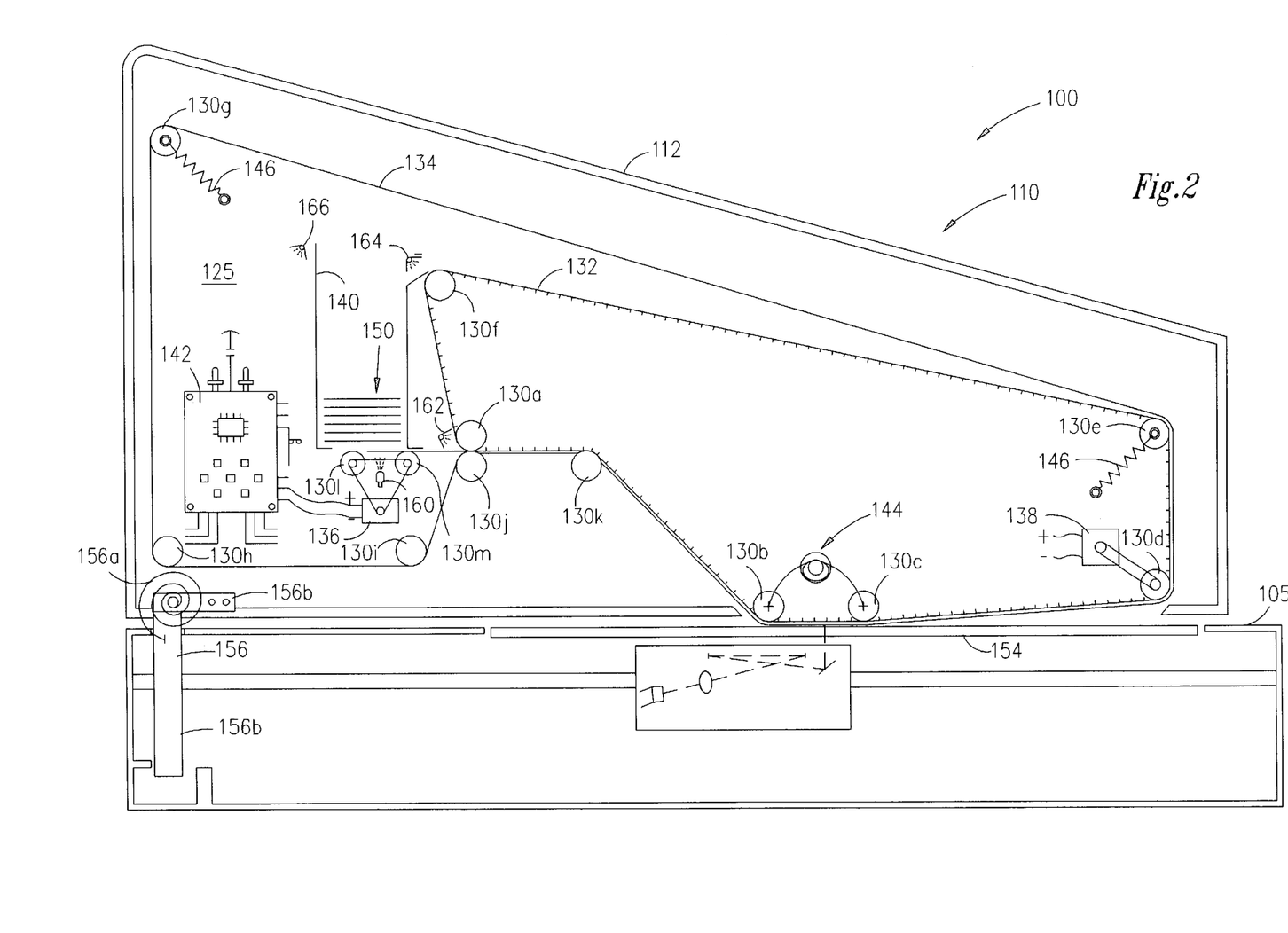
FIG. 2 illustrates a cut-away view of the system of FIG. 1.

Referring now to FIG. 2, a cut-away view of the system 100 illustrates the interior structure and components of the conventional scanner 105 and the inventive photofeeder 110. As indicated above, the casing 112 of photofeeder 110 acts as a cover to protect a housing 125 for mounting various components that make up the working structure of the inventive photofeeder 110. In particular, component housing 125 contains the basic functional elements including: rollers 130a–m, an inner belt 132, an outer transparent belt 134, a feed roller motor 136, a belt motor 138, a tray 140, and a system control unit ("SCU") 142. In addition, various conventional sensors 160–166 may be used to interact with the SCU 142 to provide operational status information. A detailed description of the SCU 142 and how it interacts with the sensors 160–166 will follow below.

Rollers 130a–f define the area contained by the inner belt 132 and rollers 130b–e and 130g–k define the area contained by the outer belt 134. Each roller 130a–m either fixably mounts to the component housing 125 or is secured to the housing by a functional device. For example, rollers 130b and 130c use a bungey device 144 and rollers 130e and 130g use a tension device to fixably mount them to the component housing 125.

The bungey device 144 creates a flat region within the belts 132 and 134 that is parallel and interactive with the scanning surface 154. This flat region provides the most effective position for a photo to be in when being scanned through the transparent outer belt 134. The tension device, such as a spring arm 146, allows the associated rollers 130e and 130g to move when necessary so that a constant tension is provided by the belts even when a photo, or some other document, is contained therebetween.

By incorporating fixed and tension mounted rollers within component housing 125, a uniform tension can be created along the inner and outer belts 132 and 134. This same tension creates the necessary friction between the inner and outer belts at rollers 130a–e to move both belts 132 and 134 simultaneously when the belt motor 138 rotates the inner belt 132. The feed and belt motors 136 and 138 rotate respective rollers 130l–m and 130d using a conventional link between the motor and rollers, such as a tension belt or gear arrangement. The feed and belt motors 136 and 138 may include a conventional electronic or mechanical counter so that the SCU 142 can track their rotation and the position of any photo captured therebetween.

The inner belt 132 is made from a fibrous material such as a fiber-nylon or elastomeric-urethane. In contrast, the outer belt 134 is made from a transparent material such as a MYLAR-polyester or a LEXAN-polyester. The component housing 125 and casing 112 are made from a material such as a plastic that has been shaped by a conventional technique, such as injection molding. The securing element used to mount the rollers 130a–m to the component housing 125 and tension devices can be selected from the group including a bolt, a rivet, an adhesive, a screw, and receiving holes.

As illustrated in the embodiment of FIG. 2, the photofeeder 110 can be attached to the scanner 105 by a conventional hinge 156. Preferably, hinge 156 will counter-balance the weight of the photofeeder 110 by a coil spring 156a coupled between the metal arms 156b used to secure the photofeeder 110 to the scanner 105. A person having ordinary skill in the relevant arts should appreciate that the hinge 156 is not necessary for the operation of the invention, however it would be desirable to have some type of mechanism to secure the photofeeder on the scanner while the photofeeder is operational. Alternative mechanisms that could be used to secure the photofeeder to the scanning surface include a clamp, the users hand, and a containing ridge on the scanner that surrounds the scanning surface and dimensionally fits within the photofeeder casing 112.

Figure 3:
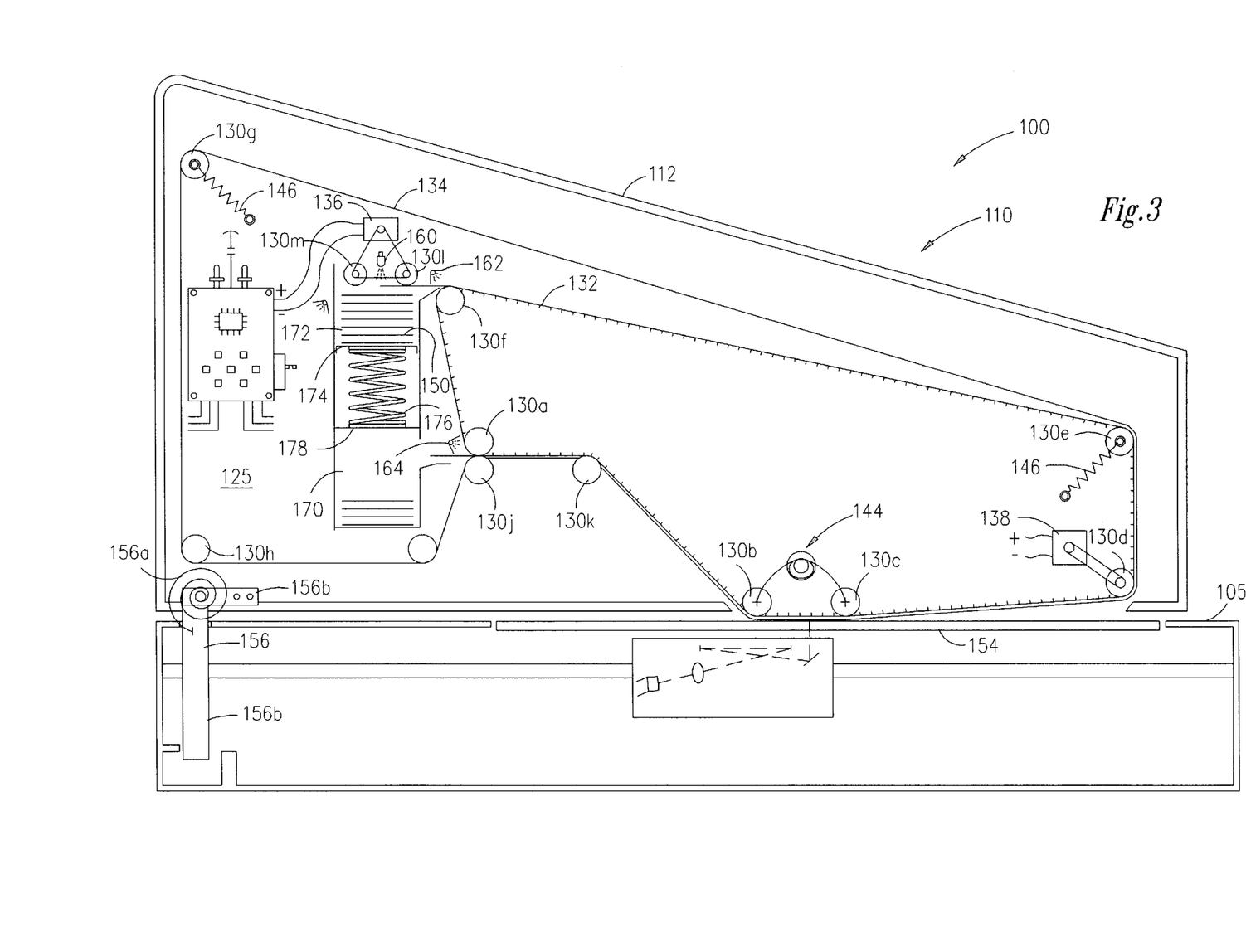
FIG. 3 illustrates a cut-away view of a photographic feeder and scanner system in accordance with another embodiment of the present invention.

Turning now to FIG. 3, an alternative embodiment is illustrated for positioning each photographic print over the desired scanning surface 154. In particular, the structure is the same as the above embodiment, however, the feeder motor 136 and rollers 130l–m have been attached to the housing on the opposite end of the tray 140, the belt rotation has been reversed, and the tray 140 has been converted into a return tray 170 and a holding tray 172 that provides an adjustable floor 174.

The adjustable floor 174 interacts with the operation of the photofeeder 110 by moving up or down so that the feed rollers 130l–m can always interact with the top most photo in the tray 172. In the most simplistic manner, the adjustable or weight sensitive floor 174 could be constructed with a tension spring 176 positioned between the adjustable floor 174 and a dividing wall 178, as illustrated. The skilled artisan should appreciate that various conventional methods could also be used to make the floor 174 adjustable. For example, a conventional telescoping piston or fork-lift type system could be implemented in place of the spring that would operate after exchanging input and output ("I/O") signals with the SCU 142. In particular, the SCU 142 could instruct the floor 174 to move down when the tray door was open for inserting the desired photographic prints to be scanned and move up once the tray door closed to apply the necessary pressure between the print at the top of the stack and the feeder rollers 120l–m. Like the spring, the floor would continue to move slightly up after each photo had been removed from the top of the stack so that the feed rollers 130l and 130m could remove the next photo in the stack. Once the floor reached a specific level within the tray, the SCU 142 would recognize that all photos had been moved to the belts for scanning.

The skilled artisan should appreciate that with the instant embodiment, the plurality of photos 150 contained by the tray can only be scanned once before a user will have to interact. In contrast, the first embodiment of FIG. 2, can allow a user to make multiple copies of a stack of photos contained by the receiving tray by initiating the same commands via a graphic user interface ("GUI") or by activating the system multiple times.

With either embodiment, the skilled artisan should appreciate that the dimensions of the tray could be adjustable to accommodate various document or photographic print sizes. In the specific examples above, tray 140 can be adjusted to hold photographic prints that may vary in size from 3×5, 4×6, and 5×7 inches. In addition, the above photofeeder 110 could be modified such that the outer belt 134 is a stationary belt or sleeve that would only have to reside between rollers 130*a* and 130*e* to protect the photo as the inner belt 132 rotates to move each photo over the desired scanning surface 154.

With the above structures, a photo can be circulated through the photofeeder 110 while being protected from otherwise damaging surfaces and substances that conventional feeders can not protect from. This is possible because the outer belt 134 absorbs and protects a circulating document from any substance and surface associated therewith.

System Control Unit

As eluded to above, the system control unit ("SCU") 142, for either embodiment, regulates the operation of each photographic print 150 traveling from the tray 140 or 172, to the scanning surface 154 and back to the tray 140, or return tray 170. The number of inputs and outputs the SCU 142 manages while the inventive photofeeder 110 is operational will generally dictate what type of SCU 142 is necessary. In the above embodiments, the SCU is an 8086 chip, however, the skilled artisan should appreciate that any conventional microprocessor or an array of logic gates could be used.

Figure 4:
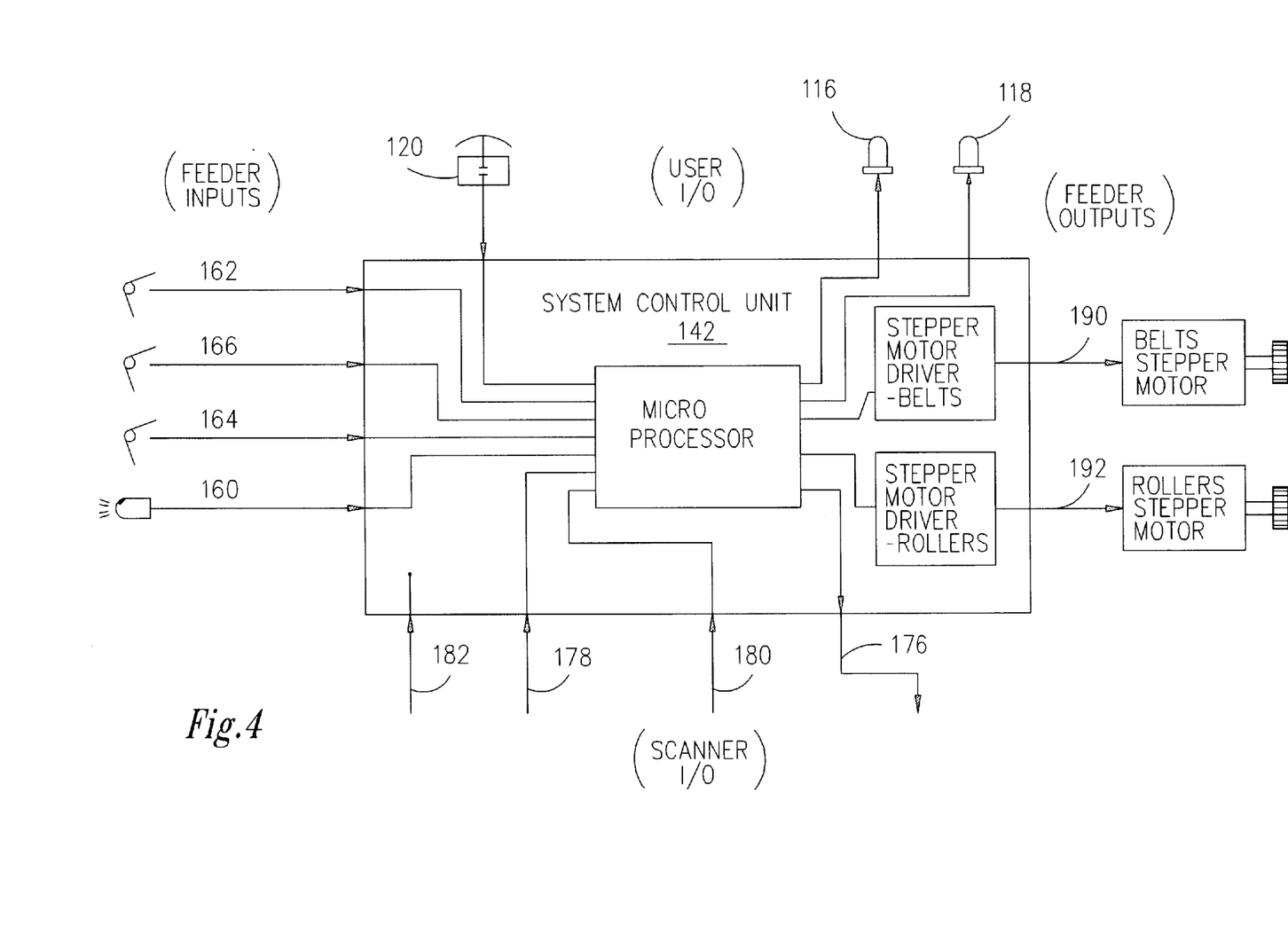
FIG. 4 illustrates a block diagram of the control system unit for managing the operation of the inventive system.

The desired SCU will be capable of managing various operational parameters or inputs and outputs ("I/O") from the photo feeder, user and scanner. In particular, the photofeeder could provide inputs from a stack sensor 160, a feed sensor 162, a return sensor 164, and a tray door sensor 166 for the SCU 142 to manage. Working together, these inputs will allow the SCU 142 to determine when a photo is possibly jammed within the system and when all photos have been scanned and returned to the tray. Individually, the stack sensor 160 indicates when all photos have been scanned. The feed sensor 162 indicates when the next photo is ready to be carried by the belts 132 and 134 to the scanning surface 154. The feed sensor 162 also indicates when to activate the belt motor counter (not shown) so that the position of the photo being carried by the belts can be tracked and controlled by the SCU 142. The return sensor 164 indicates when each scanned photo has been returned to the tray. Lastly, the door sensor 166 indicates when the tray door is closed to secure the desired photos within the tray 140 of the photofeeder 110.

With regards to the scanner I/O's, the SCU 142 activates the scanner when a photo is ready to be scanned 176 and the scanner advises the SCU when a scan has started 178 and ended 180. The scanner 105 also advises the SCU 142 when it has power 182. These I/O's, together with the inputs from the photofeeder, help the SCU 142 to provide timed outputs for the belts and roller motors 190 and 192. The belt and roller motor outputs 190 and 192 regulate how each photo travels from the tray, to the scanning surface, and back to the tray in an efficient and effective manner.

When the SCU 142 receives a user input 120 to activate the system, the SCU will review the above sensor inputs. Depending on the information provided by the scanner and photofeeder I/O's, the SCU may provide status outputs 116 and 118 to notify the user of the system status. For example, if the scanner has no power, or the tray door is open, or a photo becomes jammed in the system, it may be advantageous for the SCU 142 to notify the user by activating a red status LED 118 or an audible alarm (not shown). Similarly, the activation of a green status LED 116 might indicate that all components of the system are operational.

Operation and Process of Invention

Figure 5:
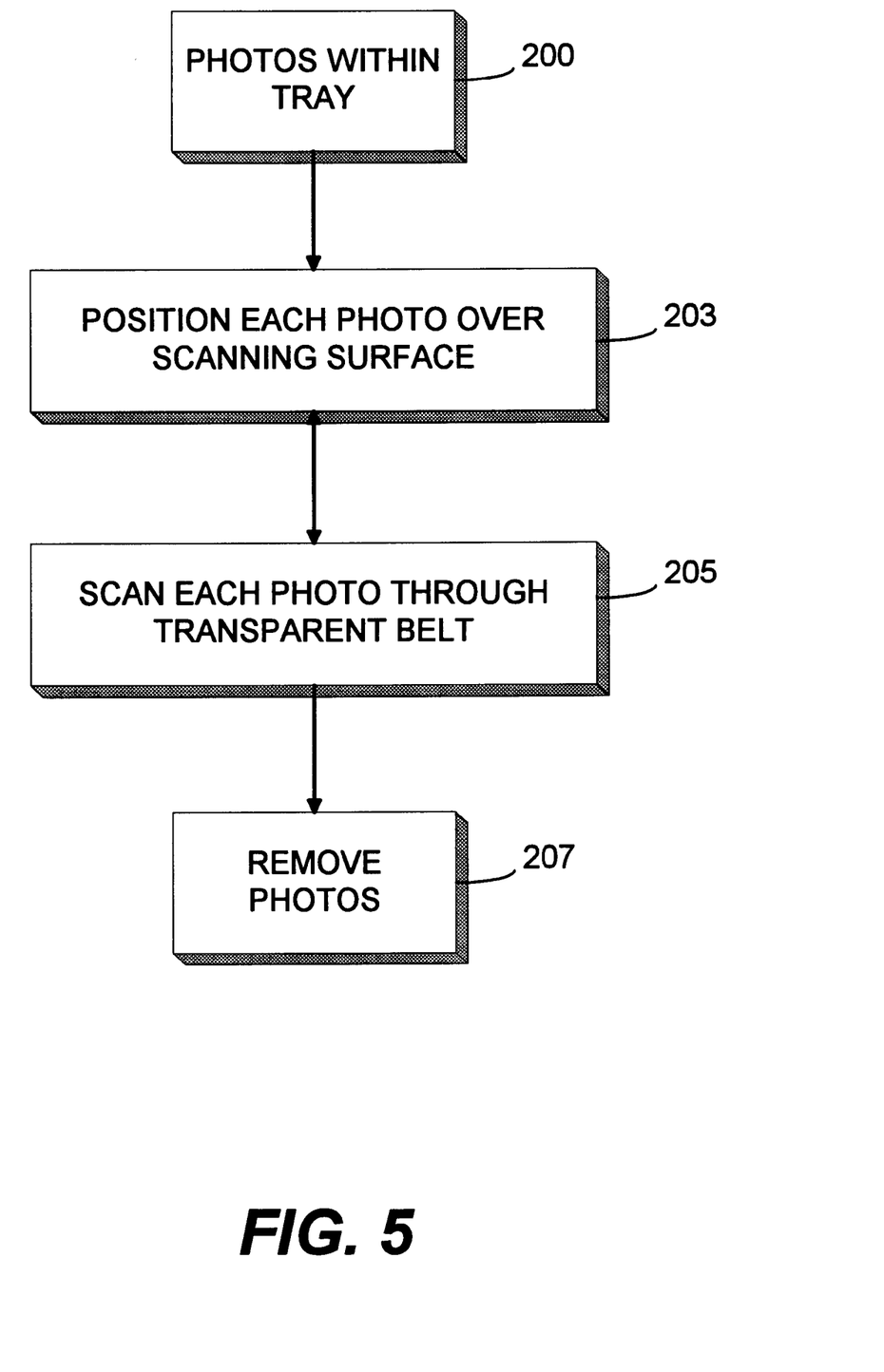
FIGS. 5, 6A and 6B illustrate a basic and detailed flow chart outlining the operation of the present invention.
Figure 6A:
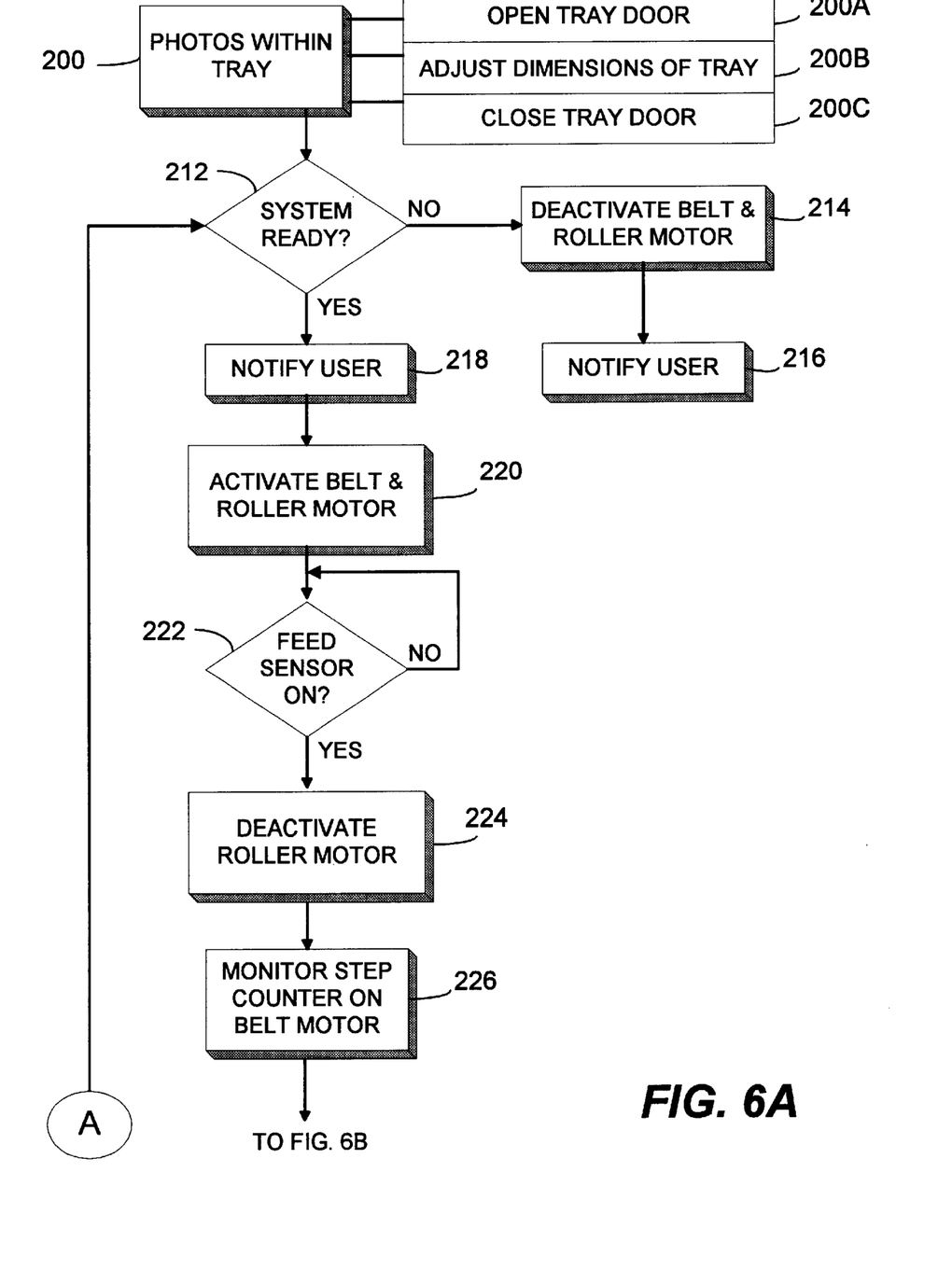
Figure 6B:
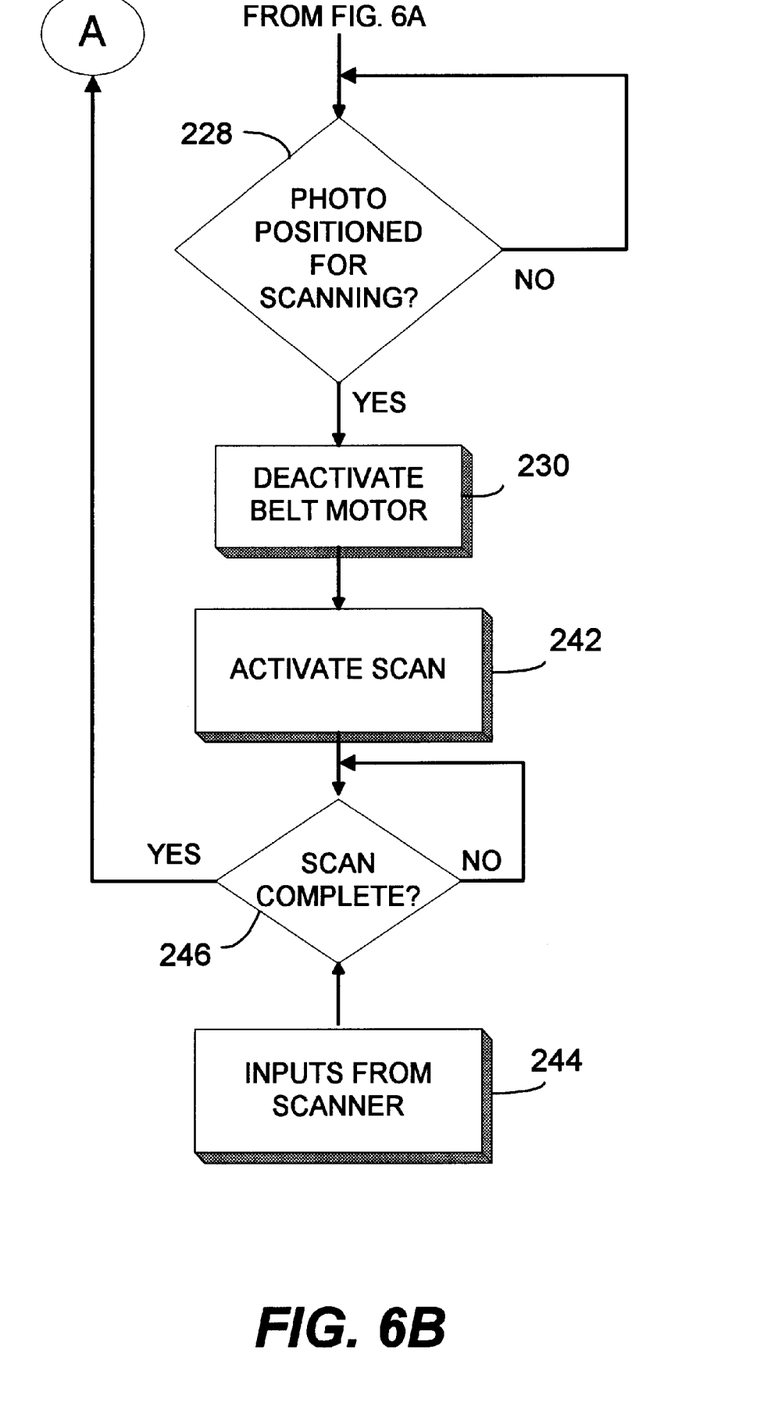

Referring now to FIGS. 5, 6A and 6B, a basic and detailed process for using the inventive embodiments described above will now follow. For purposes of clarity and simplicity, the following example will reference the structural embodiment and reference numbers of FIGS. 1, 2 and 4.

As illustrated in FIG. 5, the basic process begins after the user positions the desired "photos within tray" 200 and activates the belt and roller motors 136 and 138 of the photofeeder 110 by a conventional means, such as a switch or button 120. With the roller and belt motors 136 and 138 active, the photofeeder 110 will sequentially "position each photo over the scanning surface" 203 and "scan each photo through the transparent belt" 205. Once all photos have been scanned, the photofeeder 110 stops the roller and belt motors 136 and 138 so that the user can "remove the photos" 207.

As eluded to above, the above process for scanning each photo may be activated by simply pushing a conventional start button 120 to activate the belt motor 138, the roller motor 136 and the scanner 105 at timed intervals using a simplistic logic gate array. However, many user interactive and control features are lost with such a rudimentary approach. Consequently, a more complex process will now be described with reference to FIGS. 6A and 6B to clearly illustrate the various issues that could be managed during the above process with the help of a system control unit 142.

As before, the process begins by the user positioning the desired "photos within a tray" 200. However, this step may also include the user "opening a tray door" 200A, "adjusting the dimension of the tray" 200B to accommodate the length and width (e.g., 3×5, 4×6 and 5×7 inches) of the photos being inserted, and "closing the tray door" 200C to secure the photos within the tray 140. Consequently, a sensor 166 coupled to the tray door 114 may provide inputs to a system control unit ("SCU") 142 to indicate when the tray door is open or closed.

With the photos secured in the tray 140, the user will activate the roller and belt motors 136 and 138 of the photofeeder 110. Although this may occur by the user simply depressing a conventional button 120, a user could also interact with a graphical user interface ("GUI") of a host computer to accomplish the same thing. However, before each motor 136 and 138 begins to rotate, the SCU 142 obtains inputs from various sensors of the system 100. The inputs will answer the question: "Is System Ready" 212. Such inputs may come from various components of the system 100 selected from the group including: the tray door 166, scanner power 178, feed sensor 162, return sensor 164, stack sensor 160, roller and belt motor 136 and 138, and scanner status 180 and 182 (see FIG. 4).

If any of the sensors respond negatively, the SCU 142 may send command signals to "Deactivate the Belt and Roller Motor" 214 and "Notify the User" 216 that the system is not ready. Such a notification could be accomplished by simply activating a red LED 118, an audible alarm, or a display on a host computer using the GUI. In contrast, if the inputs indicate that the system is ready, the SCU 142 will "Notify User" 218 of the same, and "Activate Belt and Roller Motors" 220. As before, the user may be notified that the system is ready by the SCU 142 activating a green LED 116, an audible alarm or a display on the host computer using the GUI.

In a preferred embodiment, once the user is notified that the system is ready, the belt motor 138 will be activated to rotate the inner and outer belts 132 and 134 before the roller motor 136 is activated. This sequence will help to prevent any two photos from interacting with each other as they move from the tray 140 toward the point where the belts 132 and 134 interact and the feed sensor 162 turns on.

The active belts 132 and 134, rollers 130*l* and 130*m*, and their respective motors 138 and 136 will continue to rotate while the feed sensor 162 is off. However, when the SCU 142 receives an input indicating that the "Feed Sensor is On" 222 (i.e., a photo is ready to be received between the belts 132 and 134), the SCU 142 will "Deactivate Roller Motor" 224 and "Monitor Step Counter on Belt Motor" 226.

Once the belt motor counter reaches a desired count to signify that the captured "Photo is Positioned for Scanning" 228, the SCU 142 will "Deactivate the Belt Motor" 230 and "Activate the Scanner" 242. At such time, the SCU 142 waits for "Inputs from Scanner" 244 to confirm that the scan has started 180 and ended 182. These inputs will allow the SCU to verify when the "Scan is Complete" 246 and thereby allow the system to proceed with the scanning process for the next photo 150 of the tray 140 by returning to the "System Ready" 212 step. The "System Ready" 212 step creates the recursive process necessary to automatically scan each photo contained by the tray. The recursive loop ends when SCU 142 determines from its operational parameter inputs that all photos have been scanned or that a negative response has been received during the step of "System Ready" 212.

A person of ordinary skill in the relevant arts should appreciate that the step of "Deactivate Belt Motor" 230 may be eliminated from the above process if the step of positioning the photo over the scanning surface does not require the belts to stop while the photo is being scanned through the transparent outer belt 134. Consequently, each photo being fed to the belts by the feed rollers would be separated within the belts by the interaction time necessary to grab a new print with the feed rollers 130*l* and 130*m* and move it to the belts for circulation and scanning. Similarly, it may be desirable to never "Deactivate the Roller Motor" 224 after a photo is grabbed by the belts so that a minimum gap is created between each photo to be scanned. The gap between each photo could be increased or decreased by changing the rotational speed of the belt or roller motors 136 and 138.

In summary, the component housing 125 of photofeeder 110 provides a spatial and structural environment to attach various fixed and tension rollers for creating a uniform tension on an opaque inner belt and a transparent outer belt. The inner and outer belts act as a cradle to transport photographic prints from a tray, to a scanning surface, and back to the tray 140 upon control signals from a system control unit 150. Because the outer belt 134 is transparent, the photographic prints or documents transferred from the tray to the scanning surface and back to the tray, never physically touch the scanning surface or rollers used to circulate the belts. Therefore, the physical interaction between each photo with the photofeeder and scanner is minimal.

What is claimed is:

1. An apparatus for positioning a plurality of documents over a scanning surface, comprising:
    a peripheral device having a scanning surface;
    a component housing positioned over the scanning surface and comprising:
        an inner belt;
        an outer belt that interacts with the inner belt adjacent the scanning surface;
        a belt motor for circulating the inner belt;
        a tray for containing the plurality of documents;
        a roller sensor to indicate when the tray contains a document; and
        a roller motor for moving each document of the plurality of documents contained by the tray to a location where the inner and outer belts can interact with the document.

2. The apparatus of claim 1, further including a control system unit electrically coupled to the roller motor, the belt motor, and the peripheral device to regulate the operation of the apparatus.

3. The apparatus of claim 1, wherein the outer belt surrounds the inner belt and simultaneously rotates with the inner belt.

4. The apparatus of claim 1, wherein the outer belt is transparent.

5. The apparatus of claim 1, further including a sensor to monitor an operational parameter selected from the group including position of tray door, number of documents within tray, location of a documents, position of belt, and operations status of peripheral device.

6. The apparatus of claim 1, further includes a feed sensor to indicate when each document of the tray has moved to the location where the inner and outer belts can interact with the document.

7. The apparatus of claim 1, further includes a return sensor to indicate when each document that has been positioned over the scanning surface has returned to the tray.

8. The apparatus of claim 1, further includes a tray door sensor for indicating when a door for enclosing the plurality of documents in the tray is open.

9. The apparatus of claim 1, further including a casing for covering the component housing.

10. The apparatus of claim 11, wherein the casing further including a tray door and at least one system operation indicator.

11. The apparatus of claim 1, further including a hinge mechanism for pivotally securing the component housing to the peripheral device.

12. The apparatus of claim 1, further including a plurality of fixed and tension rollers attached to the component housing to define the circulation path of and the tension within the inner and outer belts.

13. The apparatus of claim 1, wherein the tray can be adjusted to accommodate a plurality of document dimensions.

14. An apparatus for positioning a plurality of documents over a scanning surface, comprising:
    a peripheral device having a scanning surface;
    a component housing positioned over the scanning surface and comprising:
        an inner belt;
        an outer belt that interacts with the inner belt adjacent the scanning surface;
        a belt motor for circulating the inner belt;
        a tray for containing the plurality of documents;
        a sensor to indicate when each document that has been positioned over the scanning surface has returned to the tray; and
        a roller motor for moving each document of the plurality of documents contained by the tray to a location where the inner and outer belts can interact with the document.

* * * * *